United States Patent [19]
Joly et al.

[11] Patent Number: 5,338,525
[45] Date of Patent: Aug. 16, 1994

[54] MFI-TYPE ZEOLITE AND ITS PREPARATION PROCESS

[75] Inventors: Jean-Francois Joly, Paris; Philippe Caullet, Illzach; Jean-Louis Guth; Anne-Catherine Faust, both of Mulhouse; Nathalie Brunard; Frédéric Kolenda, both of Lyons, all of France

[73] Assignee: Institut Francais du Petrole, Rueil Malmaison Cedex, France

[21] Appl. No.: 923,880

[22] PCT Filed: Dec. 24, 1991

[86] PCT No.: PCT/FR91/01068
§ 371 Date: Oct. 16, 1992
§ 102(e) Date: Oct. 16, 1992

[87] PCT Pub. No.: WO92/12096
PCT Pub. Date: Jul. 23, 1992

[30] Foreign Application Priority Data
Dec. 27, 1990 [FR] France .................. 90 16529

[51] Int. Cl.$^5$ .................. C01B 33/26; B01J 29/06
[52] U.S. Cl. .................. 423/326; 423/329.1; 423/332; 502/61; 502/64
[58] Field of Search .................. 502/64, 60, 61, 66; 423/328.2, 329.1, 332, 326

[56] References Cited

U.S. PATENT DOCUMENTS

| | | | |
|---|---|---|---|
| 4,761,511 | 8/1988 | Barlow | 585/417 |
| 4,806,699 | 2/1989 | Smith et al. | 585/415 |
| 4,868,146 | 9/1989 | Chu et al. | 502/64 |
| 5,034,363 | 7/1991 | Petit et al. | 502/61 |
| 5,202,513 | 4/1993 | Kanai | 585/415 |

FOREIGN PATENT DOCUMENTS

| | | |
|---|---|---|
| 0306238 | 3/1978 | European Pat. Off. . |
| 0124271 | 11/1984 | European Pat. Off. . |
| 0402801 | 12/1990 | European Pat. Off. . |

OTHER PUBLICATIONS

Chemical Abstract, vol. 104, No. 10, Mar. 10, 1986, Columbus, Ohio US; Abstract No. 75827Z; Zhao, Zhenhua: "Synthesis of ZSM-5 Zeolite with a New Method", p. 449; column G; & Hunan Shifan Daxue Xuebac, Zirhan Kexueban 1985, 8(3), 60–66.

Chemical Abstracts, vol. 105, No. 18, Nov. 3, 1986, Columbus, Ohio US; Abstract No. 155556W, "Direct Synthesis of ZSM-5 Zeolite" p. 149 column G; & CN 85100463 (Feb. 10, 1986).

*Primary Examiner*—Anthony McFarlane
*Attorney, Agent, or Firm*—Antonelli, Terry, Stout & Kraus

[57] ABSTRACT

Synthetic crystalline zeolite of the MFI type and its preparation process, said zeolite being characterized by:
a) the following approximate general formula:

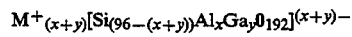

$$M^+{}_{(x+y)}[Si_{(96-(x+y))}Al_xGa_yO_{192}]^{(x+y)-}$$

in which M represents an alkaline cation and/or ammonium cation and/or a proton, x is a number between 0 and 24, y is a number between 0 and 24, (x+y) is a number between 0.64 and 24 and preferably between 1.88 and 19.2,
b) a X-ray diagram of its ammonium form shown in Table I of the description and
c) a fluorine content of its ammonium form between approximately 0.01 and 2.0% by weight, said zeolite having been synthesized in a fluoride medium and in the absence of an organic agent.

15 Claims, No Drawings

MFI-TYPE ZEOLITE AND ITS PREPARATION PROCESS

BACKGROUND OF THE INVENTION

The present invention relates to a novel MFI-type zeolite and to a process for preparing said zeolite.

As a result of their geometrical selectivity and ion exchange properties, zeolites are industrially used on a wide scale, both in adsorption (e.g. gas drying, separation of straight and branched-chain paraffins) and in catalysis (e.g. catalytic cracking, hydrocracking, isomerization and oligomerization).

All the MFI-type zeolites containing Al and/or Ga prepared up to now have been synthesized either in an alkaline medium (pH generally above 9) in the presence or absence of organic agents, or in a fluoride medium (pH generally below 10) in the presence of organic agents.

The fluoride synthesis medium can be used for obtaining the MFI zeolite (FR-A-2567868, 2607128). All the syntheses of MFI zeolites in a fluoride medium according to the prior art are characterized by the presence in the reaction medium of an organic agent, e.g. tetrapropyl ammonium (TPA+) or tetrapropyl phosphonium. The proton form of the zeolite is then obtained by calcination. From an economic standpoint, it would be advantageous to be able to synthesize the MFI zeolite in the absence of an organic structuring agent. Compared with the alkaline synthesis medium (OH−) the fluoride medium has a certain number of very significant advantages (cf. e.g. J. L. Guth, H. Kessler and R. Wey, Proc. 7th Int. Zeolite Conf., Tokyo, Aug. 17–22, 1986, p.121). Thus, in the alkaline medium, most synthesized zeolites are metastable, so that during synthesis more stable solid phases may appear and undesired phases may be precipitated. This difficulty is increased when the quantities to be prepared increase, i.e. on passing from the laboratory to the industrial scale.

A supplementary advantage of syntheses carried out in a fluoride medium compared with those carried out in a conventional OH−medium is that solids are obtained, whose acid and ion exchange properties are of different natures. The acid catalysts prepared from the solids obtained in the fluoride medium have improved catalytic properties. At this level it is very important to point out that the crystallographic structure of a solid is not sufficient to entirely define its properties and more particularly its acid properties, which play a vital part in catalysis.

SUMMARY OF THE INVENTION

Unlike in the case of their homologs prepared in a basic medium in the absence of an organic agent according to the prior art, the MFI-type zeolites according to the invention contain fluorine after synthesis. As will be shown hereinafter, fluorine gives the MFI zeolites according to the invention special acid and ion exchange properties. Unlike the MFI zeolites synthesized in the fluoride medium according to the prior art, the MFI zeolites according to the invention are prepared in the complete absence of an organic structuring agent.

The invention therefore relates to a novel synthetic crystalline zeolite of the MFI type, as well as a synthesis process in a fluoride medium and in the absence of an organic agent and which also gives the zeolites according to the invention improved properties and in particular acid properties. The MFI zeolite according to the invention can be used in adsorption and in catalysis.

DETAILED DESCRIPTION OF THE INVENTION

The synthetic crystalline zeolite of the MFI type according to the invention is characterized by:
a) its following approximate general formula:

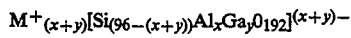

$$M^+_{(x+y)}[Si_{(96-(x+y))}Al_xGa_yO_{192}]^{(x+y)-}$$

in which M represents an alkaline cation and/or an ammonium cation and/or a proton, x being a number between 0 and 24, y a number between 0 and 24, (x+y) a number between 0.64 and 24 and preferably between 1.88 and 19.2, b) an X-ray diagram of its ammonium form shown in Table I of the description, c) a fluorine content of its ammonium form between approximately 0.01 and 2.0% by weight, preferably between approximately 0.02 and 1.0% by weight.

It is also characterized in that it was synthesized in a fluoride medium and in the absence of an organic agent.

The invention also relates to a process for the preparation of said MFI-type zeolite and which in particular comprises:

a) the formation of a reaction medium in solution having a pH below approximately 9 and containing water, at least one silica source, at least one aluminium source, at least one gallium source, at least one mobilizing agent source containing fluoride ions (F−), at least one alkaline cation source (A+), said alkaline cations preferably being sodium cations (Na+), optionally at least one ammonium cation source (NH+4), said reaction mixture having a composition, in molar ratio terms, within the following value ranges:

Si/(Al+Ga): 7–60, preferably 14–50,
F−/Si : 0.1–10, preferably 0.1–8,
H₂O/Si : 5–25, preferably 10–25,
A+/Si : 0.1–10, preferably 0.1–8,
A+/(A+ +NH₄+) : 0.1–1, preferably 0.3–1, b) the said reaction mixture is maintained at a heating temperature between approximately 90 and approximately 300° C., preferably between approximately 130 and approximately 250° C. until a crystalline compound is obtained.

It is possible in an advantageous manner to heat the reaction mixture in an autoclave internally coated with polytetrafluoroethylene (PTFE) between approximately 90 and approximately 300° C. and preferably between approximately 130 and approximately 250° C., for a time which can vary from a few hours to a few days (normally between 8 and 1200 hours) as a function of the reaction temperature adopted, until a crystalline solid is obtained, which is separated from the mother liquors generally by filtration and which is then washed, e.g. with distilled water. Advantageously, it is possible to prepare said reaction mixture at a pH between approximately 4 and approximately 9 and in preferred manner between approximately 6 and approximately 9.

According to a preferred method for the preparation of the MFI-type zeolites according to the invention, the molar ratios of the constituents of the reaction mixture are in the following value ranges:

Si/(Al+Ga) : 14–40
F−/Si : 0.2–5
H₂O/Si : 10–20

$A^+/Si$ : 0.2–5

$A^+/(A^+ +NH_4^+)$ : 0.5–1.

It is optionally possible to add to said reaction mixture at least one complementary salt in a complementary salt/$SiO_2$ molar ratio generally between 0.1 and 0.4 and preferably between 0.2 and 0.5 and/or at least one nucleus of the zeolite formed according to the invention in a zeolite crystal/$SiO_2$ weight ratio generally between 0.01 and 0.1 and in preferred manner between 0.02 and 0.03, in such a way that the morphology, the size of the crystals and the crystallization kinetics can be advantageously controlled. It is advantageous to work in a stirred medium, which makes it possible to considerably reduce the reaction time.

The pH of the reaction medium, below approximately 9, can be obtained either directly from one or more reagents used, or by the addition of an acid, a base, an acid salt, a basic salt or a complementary buffer mixture.

Numerous silica sources can be used. Particular reference is made to silicas in the form of hydrogels, aerogels, colloidal suspensions, as well as the silicas resulting from the precipitation of solutions of soluble silicates or the hydrolysis of silicic esters such as the tetraethyl ester of orthosilicic acid $Si(OC_2H_5)_4$ or complexes such as sodium fluorosilicate $Na_2SiF_6$ or ammonium fluorosilicate $(NH_4)_2 SiF_6$. Among the aluminium sources used, preference is given to the use of aluminium chloride hydrate ($AlCl_3, 6H_2O$), aluminium nitrate nonahydrate ($Al(NO_3)_3, 9H_2O$), aluminium sulphate with 16 molecules of water or aluminium fluoride trihydrate $AlF_3, 3H_2O$, whilst reference can also be made to alkoxides.

Moreover, in place of starting with separate silica and aluminium sources, it is also possible to use sources where the two elements are combined, such as e.g. a freshly precipitated aluminosilicate gel.

The gallium sources used are e.g. hydroxides, hydroxyoxides and oxides of gallium, gallates and different esters, together with gallium salts (e.g. sulphate, nitrate, chloride, fluoride and acetate).

It is also possible to use sources containing the elements silicon and gallium in combination, such as e.g. glasses or co-gels. It is possible to use sources where the gallium and aluminium elements are combined such as e.g. gels obtained by the coprecipitation of aluminium and gallium hydroxide or oxyhydroxides.

It is also possible to use sources where the elements gallium, aluminium and silicon are combined such as e.g. amorphous gels, glasses or crystalline galloaluminosilicates, among which reference can be made to clays and zeolites.

The $F^-$ fluoride anions can be introduced in the form of alkali metals or ammonium salts such as e.g. NaF, $NH_4F$, $NH_4HF_2$ or in acid form such as HF, or in the form of hydrolyzable compounds able to release fluoride anions in the water such as silicon fluoride $SiF_4$ or ammonium fluorosilicate $(NH_4)_2SiF_6$ or sodium fluorosilicate $Na_2SiF_6$.

The acids or acid salts, bases or basic salts optionally added to bring the pH to the desired value are chosen from among standard acids such as e.g. HF, HCL, $HNO_3$, $H_2SO_4$, $CH_3COOH$ or acid salts such as e.g. $NH_4HF_2$, $KHF_2$, $NaHSO_4$, the standard bases such as e.g. $NaHCO_3$, $CH_3COONa$, $Na_2S$, NaHS or the buffer mixtures such as e.g. ($CH_3COOH$, $CH_3COONa$) or ($NH_4OH$, $NH_4Cl$).

The process for the preparation of MFI-type zeolites according to the invention can also comprise, following stages a) and b) referred to hereinbefore, at least one of the two following stages:

c) the compound obtained in stage b) undergoes an ion exchange treatment using ammonium cations ($NH_4^+$), d) the compound obtained in stage b) (in the case where no stage c) is performed) or in stage c) is calcined at a temperature above approximately 350° C., preferably above approximately 450° C. and advantageously between 520° and 750° C., generally under a dry gas atmosphere, such as e.g. air or an inert gas.

It is possible to introduce into the MFI structure zeolite according to the invention, using well known ion exchange methods, at least one element of the periodic classification of elements, whose cations can be prepared in an aqueous medium and which are chosen from among groups IIA, IIIA, IB, IIB, IIIB, IVB, VIII of the periodic classification of elements. Reference is made in exemplified manner to alkali metal, alkaline earth or rare earth cations $Fe^{II}$, $Fe^{III}$, $Co^{II}$, $Co^{III}$, $Ni^{II}$, $Cu^{II}$, $Ag^{I}$ and $Pt^{II}$.

The identification of the MFI-type zeolites according to the invention take place in an easy manner on the basis of their X-ray diagram of their ammonium form. This X-ray diagram can be obtained with the aid of a diffractometer using the conventional powder method with $K\alpha$ radiation of the copper. An internal standard makes it possible to accurately determine the values of the $2\theta$ angles associated with the diffraction peaks. The interplanar spacings $d_{hkl}$ characteristic of the sample are calculated on the basis of Bragg's law. The estimate of the measurement error $\Delta(d_{hkl})$ on $d_{hkl}$ is calculated as a function of the absolute error $\Delta(2\theta)$ allocated to the measurement of $2\theta$ by Bragg's law. In the presence of the internal standard, said error is minimized and is taken as equal to $\pm 0.05°$. The relative intensity I/Io allocated to each value of $d_{hkl}$ is estimated on the basis of the height of the corresponding diffraction peak. The latter can also be determined on the basis of a radiograph obtained with the aid of a powder camera.

Table I shows the X-ray diagram characteristic of the ammonium form of the MFI-type zeolite according to the invention. In the $d_{hkl}$ column are given the values of the interplanar spacings $d_{hkl}$. Each of these values must be affected with the measurement error generally between $\pm 0.07$ and $\pm 0.02$ as a function of the value of $2\theta$ ($d_{hkl}$ is expressed in Angstroms, $1\text{Å}=10^{-10}$m ).

The MFI structure zeolite according to the invention, optionally containing at least one element of the periodic classification defined hereinbefore, can be used singly or mixed with a matrix within a catalyst. After synthesis and modification (e.g. passing into the hydrogen form by exchanges and then calcination in air), said zeolite can e.g. be shaped using a matrix, which can be inert or active for the reaction to be promoted.

The matrix used are generally chosen from within the group formed by clays, aluminas, silica, magnesia, zirconia, titanium dioxide, boron trioxide and any combination of at least two of the aforementioned compounds such as silica-alumina, silica-magnesia, etc. All known agglomeration and shaping methods can be used, such as e.g. extrusion, pelletizing, drop coagulation, etc.

The catalyst then has a MFI-type zeolite weight content between in general 1 and 99.5%, preferably between 20 and 95% and a matrix weight content generally between 0.5 and 99%, preferably between 5 and 80%.

The catalyst containing the MFI structure zeolite according to the invention can also contain a hydrogenating function or a metal compound chosen from within the groups IA, IIIA, VIB (Cr, Mo, W) and VIII (Pt, Pd and/or Ni in exemplified manner) of the periodic classification of elements. Said metal or metal compound is deposited on the zeolite by any known method.

TABLE I

| $d_{hkl}$ (Å) | $I/I_o$ |
|---|---|
| 11.14 | 66 |
| 9.99 | 43 |
| 9.72 | 18 |
| 7.44 | 7 |
| 6.71 | 11 |
| 6.37 | 11 |
| 5.99 | 17 |
| 5.70 | 13 |
| 5.58 | 17 |
| 5.38 | 6 |
| 5.14 | 6 |
| 4.98 | 11 |
| 4.62 | 9 |
| 4.37 | 16 |
| 4.27 | 13 |
| 4.10 | 11 |
| 4.01 | 14 |
| 3.86 | 100 |
| 3.82 | 94 |
| 3.75 | 62 |
| 3.73 | 66 |
| 3.65 | 33 |
| 3.60 | 10 |
| 3.49 | 13 |
| 3.45 | 14 |
| 3.36 | 13 |
| 3.32 | 17 |
| 3.05 | 16 |
| 2.98 | 21 |
| 2.95 | 10 |

The following examples illustrate the invention without limiting its scope.

EXAMPLE 1

In a 0.5 liter Monel autoclave (Monel is an alloy of copper and nickel), are dissolved 50.4 g of NaF (1.2 mole) at ambient temperature in 270 g of water (15 moles). To this solution are then added, accompanied by stirring and in succession, 74.45 g of Tixolex 28 exchanged by $NH_4$ of ratio Si/Al=7.45 and 0.75 g of MFI zeolite crystals synthesized in a fluoride medium and not calcined (i.e. approximately 1.4% by weight of the silica used). The composition of the reaction mixture in molar ratio terms is:

si/al=7.45; $F^-$/Si=1.36; $H_2O$/Si=17;
$Na^+$/Si=1.36

The pH of the reaction mixture is approximately 8. The mixture is heated to 200° C. and is kept at this temperature, accompanied by slow stirring, for 44 hours. After said synthesis, the solid is collected by filtration, washed with distilled water, dried in the oven at 80° C. for a period of 24 hours.

The product obtained is crystallized in MFI zeolite form, as shown by the X-ray diagram of its ammonium form (obtained by ion exchanges with ammonium cations), which is characteristic of the MFI zeolite. Its $SiO_2/Al_2O_3$ molar ratio determined by chemical analysis is 15.1 and the volume of its lattice unit is 5.410 $nm^3$.

The fluorine weight content of its ammonium form is 1.0%.

EXAMPLE 2

In a 0.5 liter Monel autoclave (alloy of copper and nickel) are dissolved 50.4 g of NaF (1.2 moles) at ambient temperature in 270 g of water (15 moles). To this solution are then added, accompanied by stirring and in succession, 74 g of Tixolex 28 treated by $HNO_3$ with a Si/Al ratio of 14.6 and 0.74 g of MFI zeolite crystals synthesized in a fluoride medium and not calcined. The composition of the reaction mixture in molar ratio terms is as follows:

Si/Al=14.6; $F^-$/Si=1.36; $H_2O$/Si=16

The pH of the reaction mixture is approximately 7.5. The mixture is heated to 200° C. and is kept at this temperature, accompanied by slow stirring, for 44 hours. Following this synthesis, the solid is collected by filtration, washed with distilled water and dried in the oven at 80° C. for 24 hours.

The product obtained is crystallized in the form of MFI zeolite, as is shown by the X-ray diagram of its ammonium form, which is characteristic of the MFI zeolite. Its $SiO_2/Al_2O_3$ molar ratio, determined by chemical analysis, is 18.0 and its lattice unit volume is 5.408 $nm^3$. The fluorine weight content of its ammonium form is 0.5%.

EXAMPLE 3

In a 1 liter Monel autoclave are dissolved 50.4 g of NaF (1.2 mole) at ambient temperature in 450 g of water (25 moles). To this solution are added, accompanied by stirring and in succession, 60 g of Merck silica (1 mole), 15.6 g of $\gamma Al(OH)_3$ (0.2 mole) and 0.60 g of MFI crystals synthesized in a fluoride medium and not calcined. The composition of the reaction mixture in molar ratio terms is as follows:

Si/Al=5; $F^-$/Si=1.2; $H_2O_3/_{Si}$=25; $Na/_{Si}$=1.20

The mixture is heated to 200° C. for 45 hours. After this synthesis, the solid is collected by filtration, washed with distilled water and dried in the oven at 80° C. for 24 hours.

The product obtained is characterized by the X-ray diagram of its ammonium form similar to that of Table I. Its $SiO_2/Al_2O_3$ molar ratio is 11 and the fluorine weight content of its ammonium form is 0.75%.

EXAMPLE 4

In a 1 liter autoclave are dissolved 50.4 g of NaF (1.2 mole) at ambient temperature in 45 g of water (25 moles). To this solution are then added 60 g of Merck silica (1 mole), 16.9 g of $Ga(OH)_3$ (0.14 mole, prepared from $GaCNO_3)_3$ by hydrolysis with $NH_4OH$ and 0.6 g of MFI crystals synthesized in a fluoride medium. The composition of the reaction mixture in molar ratio terms is as follows:

$Si/_{Ga}$=7; $F^-$/Si=1.2; $H_2O/_{Si}$=25

The mixture is heated to 200° C. for 45 hours. After this synthesis, the solid is collected by filtration, washed with distilled water and dried in the oven at 80° C. for 24 hours.

The product obtained is characterized by the X-ray diagram of its ammonium form similar to that of Table I. Its SiO$_2$/Ga$_2$O$_3$ molar ratio is 17 and the fluorine weight content of its ammonium form is 0.75%.

We claim:

1. Synthetic crystalline zeolite of the MFI type, characterized by:
   a) its following approximate general formula:

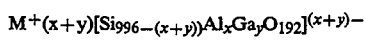

$$M^+{}_{(x+y)}[Si_{996-(x+y)}Al_xGa_yO_{192}]^{(x+y)-}$$

in which M represents an alkaline cation and/or an ammonium cation and/or a proton, x is a number between 0 and 24, y a number between 0 and 24 and (x+y) a number between 0.64 and 24,
   b) a X-ray diagram of its ammonium form shown in Table I of the description and
   c) a fluorine content of its ammonium form between approximately 0.01 and 2.0% by weight, said zeolite having been synthesized in a fluoride medium and in the absence of an organic agent.

2. Zeolite according to claim 1, characterized in that (x+y) is a number between 1.88 and 19.2.

3. Zeolite according to either of the claim 1, characterized in that the fluorine content of its ammonium form is between approximately 0.02 and 1.0% by weight.

4. Zeolite according to claim 1, characterized in that it contains at least one element chosen from among groups IIA, IIIA, IB, IIB, IIIB, IVB and VIII of the periodic classification of elements, cations of which can be prepared in an aqueous medium.

5. Zeolite according to claim 4, characterized in that said element is chosen from within the group formed by alkaline earths, alkali metals, rare earths, iron, cobalt, nickel, copper, silver, platinum and gallium.

6. Catalyst containing a zeolite according to any one of the claims 1 to 5 and a matrix.

7. Catalyst containing a zeolite according to any one of the claims 1 to 5, a matrix and at least one metal and/or compound of the metal chosen from among the groups IA, IIIA, VIB and VIII of the periodic classification of elements.

8. Catalyst according to claim 7, wherein said metal is chosen from within the group formed by chromium, molybdenum, tungsten, gallium, platinum, palladium and nickel.

9. Zeolite according to claim 1, wherein M represents ammonium cation.

10. A process for the preparation of a synthetic crystalline zeolite of the MFI type, which comprises the following steps:
    a) forming a solution of a reaction mixture having a pH below approximately 9 and containing water, at least one silica source, at least one aluminum source, at least one gallium source, at least one mobilizing agent source containing fluoride ions, at least one alkaline cation A+ source, and optionally at least one ammonium cation source; said reaction mixture having a composition, in molar ratio terms, within the following value ranges:
    Si/(Al+Ga) : 1–60
    F−/Si : 0.1–10
    H$_2$O/Si : 5–100
    A+/Si : 0.1–10
    A+/(A++NH$_4$+) : 0.1–1; and
    b) maintaining said reaction mixture at a temperature between approximately 90° and 300° C. until a crystalline zeolite is obtained; said zeolite having the following approximate general formula:

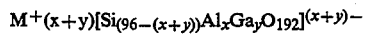

$$M^+{}_{(x+y)}[Si_{(96-(x+y))}Al_xGa_yO_{192}]^{(x+y)-}$$

wherein M represents an alkaline cation and/or an ammonium cation and/or a proton, x is a number between 0 and 24, y is a number between 0 and 24 and (x+y) a number between 0.64 and 24; a X-ray diagram of its ammonium form shown in Table I of the specification, and fluorine content of its ammonium form between approximately 0.01 and 2.0% by weight, said zeolite having been synthesized in the absence of an organic agent.

11. Process according to claim 10, wherein, in stage a), said reaction mixture has a composition, in molar ratio terms, within the following value ranges:
    Si/(Al+Ga) : 2–50
    F−/Si : 0.1–10
    H$_2$O/Si : 10–50
    A+Si : 0.1–8
    A+/(A++NH$_4$+) : 0.3–1

12. Process according to claim 10 wherein, in stage a), the pH of the reaction mixture is between approximately 4 and approximately 9.

13. Process according to claim 12, wherein said alkaline cations are Na+ cations.

14. Process according to claim 10, wherein M represents an ammonium cation.

15. A process according to claim 13, further comprising at least one of the following two steps:
    c) ion exchanging the compound obtained in step b) with ammonium cations and
    d) calcining the compound obtained in step b) or in step c) at a temperature above approximately 350° C.

* * * * *